US008782399B2

(12) United States Patent
Lamb

(10) Patent No.: US 8,782,399 B2
(45) Date of Patent: Jul. 15, 2014

(54) AUTOMATED SECURE DNSSEC PROVISIONING SYSTEM

(76) Inventor: Richard Lamb, Millbrae, CA (US)

(*) Notice: Subject to any disclaimer, the term of this patent is extended or adjusted under 35 U.S.C. 154(b) by 121 days.

(21) Appl. No.: 13/437,210

(22) Filed: Apr. 2, 2012

(65) Prior Publication Data

US 2013/0262860 A1    Oct. 3, 2013

(51) Int. Cl.
*H04L 29/06* (2006.01)
*H04L 9/00* (2006.01)
*H04L 9/32* (2006.01)
*H04L 29/12* (2006.01)

(52) U.S. Cl.
CPC ............ *H04L 9/3202* (2013.01); *H04L 63/126* (2013.01); *H04L 9/006* (2013.01); *H04L 63/00* (2013.01); *H04L 9/3265* (2013.01); *H04L 9/321* (2013.01); *H04L 63/0823* (2013.01); *H04L 61/1511* (2013.01)
USPC ........... 713/156; 713/150; 713/155; 713/168; 713/170; 713/176; 713/181; 713/182; 726/1; 726/2; 726/4; 726/10; 726/26; 726/27; 726/28; 726/29; 726/30; 709/217; 709/219; 709/225; 709/229

(58) Field of Classification Search
USPC ................ 713/150–152, 155–189; 726/1–10, 726/26–30; 380/255–260, 277–30; 709/217–229
See application file for complete search history.

(56) References Cited

U.S. PATENT DOCUMENTS

| | | | |
|---|---|---|---|
| 6,880,007 B1* | 4/2005 | Gardos et al. ................. | 709/225 |
| 2004/0083306 A1* | 4/2004 | Gloe ............................. | 709/245 |
| 2004/0199493 A1* | 10/2004 | Ruiz et al. ..................... | 707/3 |
| 2006/0174323 A1* | 8/2006 | Brown et al. .................... | 726/3 |
| 2012/0174198 A1* | 7/2012 | Gould et al. ..................... | 726/6 |
| 2012/0254386 A1* | 10/2012 | Smith et al. .................. | 709/223 |
| 2012/0278626 A1* | 11/2012 | Smith et al. ................... | 713/176 |

OTHER PUBLICATIONS

RFC 2136—Dynamic Updates in the Domain Name System (DNS Update) by Vixie et al; Publisher: IETF; Date: Apr. 1997.*
RFC 3007—Secure Domain Name System (DNS) Dynamic Update by Welington; Publisher: The Internet Society; Year: 2000.*

* cited by examiner

*Primary Examiner* — Madhuri Herzog

(57) ABSTRACT

A system and method that maintains a secure chain of trust from domain name owner to publication by extending the trust placed in existing cryptographic identity systems to the records published in the Internet's Domain Name System (DNS) and secured by its DNS Security Extensions (DNSSEC) infrastructure. Automated validation and processing occur within a secured processing environment to capture and preserve the cryptographic security from the source request.

6 Claims, 1 Drawing Sheet

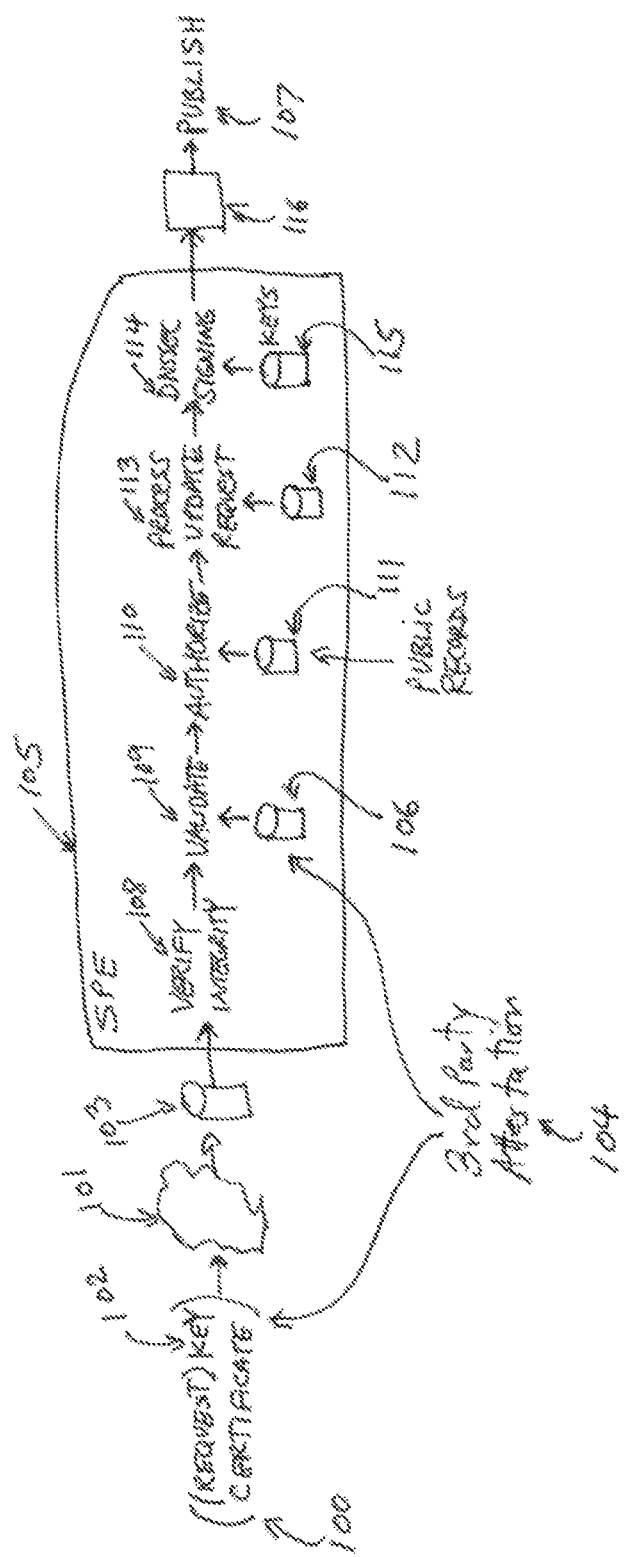

AUTOMATED SECURE DNSSEC PROVISIONING SYSTEM

TECHNICAL FIELD

The present invention relates to the secure provisioning of public Internet domain name records. More particularly, the present invention relates to a secure system and method for extending the trust placed in existing cryptographic identity systems to the records published in the Internet's Domain Name System (DNS) and secured by its DNS Security Extensions (DNSSEC) infrastructure.

DESCRIPTION OF INVENTION

With the increasing reliance of the world's population on the Internet, there have been concerted efforts to secure communications over this intrinsically open and insecure resource. Specifically, robust cryptographic systems have been developed to allow Internet users to authenticate identities, encrypt communications, and protect against surreptitious modification. However, the lack of interoperability amongst them has limited their potential to solve many of the Internet's security ills.

One of the most promising approaches to overcome this are the nascent efforts to use a secured version of the Internet's global phone book (DNS+DNSSEC) to unify existing systems (and create new ones). However, the reliance of other systems on DNSSEC as a unifying infrastructure places DNSSEC key management squarely in the chain of trust afforded by any overall system, increasing the security burden on DNSSEC. In addition, the difficulty in managing and securing keying material has stifled widespread DNSSEC adoption. The present invention seeks to reduce this increased security burden and simplify provisioning and management of keying material through automation by building on existing cryptographic identify systems.

What would simplify adoption and preserve chains of trust would be an automated DNSSEC key management and provisioning system that captures the security of domain name owner and preserves the same level in published DNSSEC data.

By combining the use of existing Public Key Infrastructure (PKI) based mechanisms, trusted $3^{rd}$ party identity attestation entities (e.g. certification authorities), out-of-band initial authorization, and a secure processing environment an automated and secured system can be made available that requires nothing but standard secure email exchanges to configure.

BRIEF DESCRIPTION OF DRAWINGS

FIG. 1 shows the flow of a secured request from a domain name owner on the left through to digitally signed, irrefutable, published DNS record on the right according to the present invention. Request validation and cryptographic operations are automatically performed inside the secured DNSSEC provisioning environment outlined in the box.

PREFERRED EMBODIMENT

In the preferred embodiment of the present invention, requests for additions, deletions, or modifications of a domain name's records (including the creation of the domain name itself) would be sent in the form of digitally signed e-mail (100) to a DNSSEC service provider chosen by the domain name owner to manage their domain name. The mechanisms providing this function are mature and available in nearly all computer systems (e.g. S/MIME). The cryptographic material used by the sender to sign their e-mail has been associated with the sender and attested to by a third party (104) in the form of a digital certificate which is delivered along with the signed e-mail. On reception, messages are stored (103) by the DNSSEC service provider. A server inside a secure processing environment (SPE) (105)[1] electromagnetically shielded, firewalled, and under tight access controls and audited processes, automatically reads these messages. The server then cryptographically checks (108) the integrity of their contents and follows a cryptographic chain to validate (109) the source of the message with a pre-determined list of trusted third party root certificates (106). If the message cannot be validated, it is discarded. Otherwise a chain of trust has been established between DNSSEC service provider, $3^{rd}$ party attester/certificate issuer (104), and domain name owner.

[1] E.g. DCID 6/9 Physical Security Standards for Sensitive Compartmented Information Facilities (SCIF), Effective 18 Nov. 2002

The server then checks (110) to see if the sender is on a pre-determined list of authorized identities (111), which may include public records such as domain name WHOIS data, for the domain to be modified. If so, the request is automatically processed by the server (113) and the updated domain name records are digitally signed using DNSSEC (114) with the domain's corresponding DNSSEC keys (115) and output to an external server outside the SPE (116) for immediate publication (107) thus completing the operation.

In the case of initial domain name creation, if the sender is authorized, the DNSSEC keys (115) are automatically generated inside the SPE server. The keys never leave the SPE in unencrypted form.

What is claimed:

1. An automated method that extends the trust in established public key identity systems to domain name system (DNS) records by creating a cryptographic trail within an audited Secure Processing Environment (SPE), comprising the steps of:
    owner generating a request to add, delete, or modify domain name records digitally signed by the owner's private key and accompanied by corresponding digital certificate;
    transmission of the request to DNS Security Extensions (DNSSEC) service provider's SPE via the public Internet;
    cryptographic verification that the request has not been modified in transit inside the SPE;
    cryptographic validation of the signed request inside SPE against a pre-configured list of trusted certificates that attest to the owner's identity;
    authorization of the request against a pre-configured list of authorized administrators for a domain name associated with the owner inside the SPE drawn from public records;
    processing of the request inside SPE to update domain name records;
    digital signing of the updated records using DNSSEC inside the SPE using DNSSEC private keys associated with the domain name;
    publication of the updated domain name records outside SPE.

2. The method of claim 1, further comprising the step of generating DNSSEC key material inside SPE for the domain name on an initial authorized creation request and as needed for key updates.

3. The method of claim 2, further comprising the step of maintaining all keying material inside the SPE with keys never leaving SPE in unencrypted form.

4. The method of claim 3, further comprising the step of encrypting responses to authorized requests from the domain name owner for sensitive material using the owner's public key to guarantee that only the owner decrypts the response with their private key.

5. The method of claim 3, further comprising the step of accepting requests encrypted using a public key corresponding to a private key only available inside the SPE to guarantee that the request only be decrypted inside the SPE.

6. The method of claim 3, further comprising the step of automatically registering additional DNS and DNSSEC records with entities responsible for their publication higher up in the DNS hierarchy.

\* \* \* \* \*